United States Patent [19]

Spicuzza, Jr. et al.

[11] 4,169,078
[45] Sep. 25, 1979

[54] FIRE AND FLAME RETARDANT COMPOSITIONS IN POWDERED FORM

[75] Inventors: John P. Spicuzza, Jr., Mount Lebanon; Hugh T. O'Donnell, Beaver, both of Pa.

[73] Assignee: Arco Polymers, Inc., Philadelphia, Pa.

[21] Appl. No.: 866,729

[22] Filed: Jan. 3, 1978

[51] Int. Cl.$^2$ .............................................. C08L 5/00
[52] U.S. Cl. ................................. 260/17.3; 106/162; 428/921; 521/106
[58] Field of Search ....................... 260/17.3; 521/106

[56] References Cited

U.S. PATENT DOCUMENTS

| 2,387,275 | 10/1945 | Leuck | 260/9 |
| 2,523,626 | 9/1950 | Jones | 260/17.3 |
| 3,551,365 | 12/1970 | Matalon | 260/17.2 |
| 3,663,267 | 5/1972 | Moran et al. | 260/17.3 |
| 3,808,159 | 4/1974 | Matalon | 521/106 |
| 3,824,200 | 7/1974 | Matalon | 521/106 |
| 3,991,021 | 11/1976 | Roth | 260/17.3 |
| 4,013,599 | 3/1977 | Strauss et al. | 260/17.3 |

OTHER PUBLICATIONS

Chem. Absts. vol. 75:37996d, Intumescence: In Situ Approach to Thermal Protection, Fohlen et al.

Primary Examiner—Edward M. Woodberry
Attorney, Agent, or Firm—Hubert E. Evans

[57] ABSTRACT

An improved flame and fire retardant composition is obtained by reacting the appropriate ingredients in liquid form, drying the product to cake form and pulverizing to obtain a fire and heat retardant powder. This powdered form is advantageous in that it may be readily handled and may be associated or used with fire unstable materials that would be adversely affected by a liquid composition. The powdered form has a low bulk density and can thus create economies in the weight of material used to provide effective fire and heat retardant properties.

5 Claims, No Drawings

FIRE AND FLAME RETARDANT COMPOSITIONS IN POWDERED FORM

BACKGROUND OF THE INVENTION

Liquid fire and heat retardant compositions can be difficult to use, especially when the liquid is a resinous, viscous material. There are processing and equipment problems in transporting and mixing this type of liquid, on a commercial scale, and in mixing it with fire unstable materials that are light and in particulate form, such as, expandable polystyrene granules, chips or pieces of cellulosic materials and the like.

When a liquid fire retardant is associated with a fire unstable material, the fact that the fire retardant composition is a liquid may be harmful and can prevent its use. There may be an undesired chemical reaction during the production of a fire resistant structure that would deleteriously affect the resulting structure. If the fire retardant composition is intended to be incorporated, for example, in a foam polyurethane structure, its reactivity or presence can prevent or interfere with the isocyanate or polyol ingredients or with the formation of a foamed polyurethane structure. A fire retardant composition in dried powdered form may be used in the production of a fire resistant composition and by virtue of not being reactive will not interfere with production of a useful effective fire resistant structure.

The fact that a powder has a much lower bulk density than a dense, resinous liquid can provide effective protection for a larger amount of fire unstable material, using a less weight of the material, creating economies in the production of fire and heat retardant structures.

SUMMARY OF THE INVENTION

A fire retardant composition may be made, dried and pulverized to a highly useful powdered product that is relatively light and readily flowable. When the fire retardant composition is of an intumescent type, it can retain substantially all of its intumescent properties when in powdered form. A preferred fire retardant composition embodying the present invention is a resinous reaction product of phosphoric acid and a reducing sugar with or without the addition of one or more substances to increase intumescence and foaming properties of the product. These compositions possess the desirable characteristic of initiating intumescence at a relatively low temperature so that the protective foam will occur at a much lower temperature than that at which the fire unstable material is adversely affected by the exposure to fire and flame.

DETAILED DESCRIPTION OF THE INVENTION

The present invention relates to fire retardant compositions, and especially those with highly effective properties to such an extent that when they are associated with fire unstable materials the resultant structure may best be described as flameproof and/or fireproof. Such structures are characterized by their great ability to withstand exposure to heat and flame conditions over a prolonged time period.

It has been found that intumescent compositions are preferable for accomplishing a high degree of flame and fireproofness. As used herein, an intumescent composition is one which upon exposure to heat and/or flame will, at a given temperature, soften and then produce a voluminous form which provides an insulating wall or zone protecting the fire unstable material from the effects of heat and flame. Upon continued exposure, the intumescent foam may turn from its normal cream, brown, tan or orange color to a black carbonaceous char. The intumescent foam and char are of relatively light density but have great integrity and strength and continue to function as insulation for the fire unstable material even though it may possess a high degree of flammability, as in the case of many synthetic plastic materials.

Illustrative of preferred compositions are the resinous reaction products of phosphoric acid and reducing sugar to which may be added at least one substance providing increased intumescence in the final composition. Compositions of this type can provide intumescence at significantly lower temperatures such as below 100° C., and thus provide earlier and longer lasting protection. Fire and flameproof compositions for use in the present invention have been derived from the teachings of the patents of Dr. Ralph Matalon in U.S. Pat. Nos. 3,551,365, 3,808,159, and 3,824,200. Also of great interest are the compositions taught in the Matalon pending application Ser. No. 755,596 filed Dec. 30, 1976, now abandoned.

While a number of fire retardant compositions may be used to illustrate the present invention, a particularly suitable composition is being selected because of its highly effective properties. This composition involves the resinous reaction product of a resin forming substance (designated as RF71) and a hardener substance (designated as 175F). The resin forming substance comprises the following approximate weights of ingredients: 3% water, 41% phosphoric acid (85% strength, it being understood that the strength of the acid used is dependent upon the water that may exist elsewhere in the formulation and the strength or amount of acid may be adjusted to compensate), dextrose 56%.

It is generally desirable to increase the intumescent properties of the resin former in its intended fire resistant use by the addition of at least one substance having the property of evolving gas especially under the influence of heat. Examples of such substances are monoammonium phosphate, oxalic acid, urea, monoethanolamine, and the like. Illustrative of a resin former having such additives is that identified as RF77, comprising the following proportions by weight: about 3% water, about 31% phosphoric acid (85% strength), about 43% dextrose, about 8% monoammonium phosphate, about 4% oxalic acid, about 10% urea, and about 1% monoethanolamine.

The resin former substances may be prepared by charging the water and phosphoric acid to a kettle and heating the same to about 70°-90° C. The reducing sugar is added and the mixture agitated for about 10 to 15 minutes. Any additional additives to provide increased intumescence in the final product are added and agitated. The kettle is closed, heated to about 120° C. for about 10 minutes, allowed to cool, and the contents discharged.

A suitable hardener or curing agent may comprise the following ingredients by weight: water about 4%, dextrose about 35%, urea about 28%, sodium hydroxide (3% strength) about 3%, furfuryl alcohol about 5% and paraformaldehyde about 25%. The following procedure is illustrative of the method of making the hardening agent. The sodium hydroxide, water, furfuryl alcohol and paraformaldehyde are charged to a reactor and mixed until dissolved at a temperature of approximately 90° C. The dextrose is added and mixed until a homogenous solution is formed. The mixture is cooled or allowed to cool to about 40° C., followed by addition of the urea and monoethanolamine. This results in an exothermic action and it is desired that the mixture be allowed to heat, but not to rise above the temperature of about 110° C., with the reactor closed. The mixture is held for about 25 minutes, allowed to cool and discharged. Alternatively, the water and dextrose may be charged to the kettle, heated and mixed until they are dissolved at about 90° C. The urea is charged and stirred until dissolved. The kettle is allowed to cool or is cooled by heat transfer to about 60° C., at which time the sodium hydroxide, furfuryl alcohol and paraformaldehyde are added. The kettle is closed, heated to about 110° C. and stirred while maintaining the temperature for about 25 minutes. As the temperature cools, the monoethanolamine may be added and stirred. When the mixture is cooled, it is then ready for use.

The resin former and hardener are mixed together in a preferred ratio of about 1 to 1; however, this ratio may be varied, with the approximate range of resin former to hardener being about 3 to 1 to about 1 to 4 depending upon the physical properties or function desired in the resultant composition. The end product is a thick viscous liquid having a density of about 1½ grams per cubic centimeter.

In accordance with the present invention, the liquid fire retardant composition is then dried. This should be accomplished in a vessel having a high ratio of surface area to volume to facilitate heat transfer in drying the composition. The liquid composition is charged to the vessel, heated to a temperature of approximately 70° to 80° C., and is then held for about 72 to 90 hours. During this time some reaction occurs, as evidenced by a slight foaming of the composition. The dried product is a foamed friable cake having a relatively uniform cellular structure throughout. This cake is then subjected to size reduction or pulverization. Suitable equipment for this purpose is that sold by Cumberland Engineering Company, Inc., of Providence, Rhode Island, having movable knives to accomplish the cutting or grinding of the cake. Since the cake is friable only a moderate action is required to reduce it to powdered form. During the drying of the product from a liquid to a powder, a weight loss of about 13 to 23% occurs. The dried cake has a bulk density of about 2 to 10 pounds per cubic foot, and the powdered product has a density of about 34 pounds per cubic foot.

Whereas the liquid resinous composition is nearly completely water soluble, the powdered product is significantly less soluble in water. The powder has some water solubility and is hygroscopic. It will over a time period coalesce losing its powder identity.

The compositions chosen to illustrate the present invention differ from those shown in the prior Matalon patents. The present compositions do not use as a foaming, gelling and hardening agent the organic polyisocyanate disclosed in Matalon U.S. Pat. No. 3,808,159, nor the powder of a polyvalent metal above cadmium in the electromotive series disclosed in Matalon U.S. Pat. No. 3,824,200. It is believed that the use of the polyisocyanates and powdered metals may be detrimental to the successful operation of the invention. If a significant amount of a metal powder is present in the fire retardant composition, it is assumed that the gases evolved upon exposure to fire and heat would include hydrogen and in the case of isocyanates the gas may have obnoxious or toxic characteristics.

In the present invention it is believed that the resin former substance and the hardener react to form a polymeric resinous product which after formation is still reactive. Over the passage of time the liquid resinous product will cure, gel and harden to a solid. It is possible that this reaction may involve condensation polymerization, which continues after formation of the liquid resin. The drying of the liquid product to a cake and subsequently a powder may serve to accelerate this polymerization action. This would account for the foaming action during drying and the weight loss from the liquid to the powder stage. It is possible that the foaming may be due to the water by-product of condensation polymerization which volatilizes during drying and causes the foaming action. It is also theorized that when the powder is used in association with a fire unstable material as a fire retardant composition, a decomposition occurs or that spumific materials are present or formed under exposure to heat with the softened state of the polymeric resin provides the voluminous foaming effect. It may be that chemically bound water is released upon exposure to heat to cause or assist in the spumific action.

The powdered fire retardant composition of the present invention is highly useful. As a powder it is highly flowable and easy to handle. The drying operation does not cause any material reduction in the intumescent properties of the product. Fire and heat resistant structures may be made, for example, by pressure injecting or sandblasting the powder onto and into the surface of fire unstable materials. When such a powder is applied by sandblasting onto panels of foam polystyrene, foam polyurethane, or even wood, the fire and heat resistance of the fire unstable materials is significantly improved.

To test the flame and heat resistance of flammable materials sandblasted by the powder of the present invention, a test identified as a Modified Bureau of Mines Burn Through Test was conducted. In this test, samples one foot square and of a thickness as described are supported in horizontal positions on tripods. Each sample is supported 2" above the top of a Fisher burner. The horizontal placement of the sample and the substitution of a Fisher burner for a propane torch are the modifications adopted for this test that differ from the Bureau of Mines Burn Through Test. The flame of the Fisher burner is adjusted to a 4¼" height with a 1¼" inner cone. A cellulosic tissue is placed on the top of the sample and the sample supported horizontally on the tripod above the flame. Burn through time is indicated by ignition of the tissue.

A control sample of a foamed polystyrene board 12" by 12" by 1" thick made from expandable polystyrene sold under the trademark DYLITE M57 was subjected to the Modified Bureau of Mines Burn Through Test and experienced a burn through time of 7 seconds with a weight loss of 50% of the sample. A similar sample, faced with 0.3 aluminum foil on the surface facing downward, had a burn through time of 15 seconds. This is in marked contrast with identical samples that had been sandblasted with the fire retardant powdered composition. With the powder applied to the two major surfaces in amounts varying from 12½ grams per square foot to 50 grams per square foot, the samples were faced with 2 mil aluminum foil. No burn through was experienced over a period of 30 minutes. The weight loss of the various samples ranged from about 14.8 to about 20%. Modified rigid polyurethane boards 12" by 12" by 2" thick, sandblast treated and faced with aluminum foil, did not experience any burn through in 30 minute tests and showed no surface burning of the sample. In contrast to this, a control sample experienced burn through in 12 minutes, and there was extreme burning of the outer surfaces of the sample.

Additional samples were subjected to the more severe Underwriters' Laboratories Tunnel Test in accordance with the "Test Method for Fire Hazard Classification of Building Materials UL723" (ANSI A2.5-1970, Apr. 14, 1970, Underwriters' Laboratories, Inc.). In this more severe test a control sample of foam polystyrene board was 100% consumed during the ten minute test period. In contrast, a foam polystyrene board sandblasted with the powdered fire retardant composition of the present invention had a very low smoke developed rating and only suffered a weight loss of 13.1%.

A powdered fire retardant composition of the present invention may be used in a suitable carrier and applied to fire unstable materials to provide them with a high degree of resistance to fire. This method of applying the fire retardant composition to a fire unstable material is advantageous in that it may be more readily applied. In its liquid form the resinous material requires as much as 3,000 pounds per square inch for pumping, mixing, and spraying, whereas the powdered material in a suitable carrier can be sprayed at a pressure of 100 pounds per square inch or less. The carrier may be water and may be used in an amount from 10 to 30% of the total weight of the carrier and powder. Another suitable carrier would be methanol.

Where the powder, in association with a carrier and fire unstable material must undergo an exposure to humid conditions, the powder may be mixed with a suitable powder or liquid water-proofing material such as silane fumed silicon dioxide or silicone. When the powder was mixed with 3 to 10% of silane, test samples remained dry and free flowing after 30 days exposure to a 100% relative humidity atmosphere.

In contrast to the liquid fire resistant composition which is nearly completely water soluble, the powder is much less water sensitive. Further since it is almost inert and not reactive compared to the liquid it can be used in the production of fire resistant structures without reacting or affecting any change in the fire resistant structure.

As another example of use, the powdered fire resistant composition may be placed in a suitable carrier, mixed with particulate fire unstable material such as for example expandable polystyrene granules, wood chips or the like, and the composite mixture placed in suitable molds and heated sufficiently to bond the mixture into a fire resistant panel structure.

I claim:

1. A pulverulent intumescent fire retardant polymeric composition which comprises the reaction product of phosphoric acid and a reducing sugar plus a hardener, said composition having been dried at a temperature below about 80° C. and below the incipient intumescent temperature of said composition and reduced to powdered form, whereby when said composition is associated with a fire unstable material and exposed to heat or flame the composition will intumesce and voluminously foam to provide an insulating barrier protecting the fire unstable material against degradation for a prolonged time.

2. A composition as claimed in claim 1 in which at least one substance for increasing intumescence is added to said reaction product.

3. A composition as claimed in claim 1 in which a water-proofing material is added to the pulverulent composition.

4. A process of making a pulverulent intumescent fire retardant polymeric composition which comprises:
    (1) reacting phosphoric acid with a reducing sugar,
    (2) adding a hardener thereto,
    (3) drying the resulting composition at a temperature below about 80° C. and below the temperature at which said composition begins intumescence, and
    (4) reducing said composition to a powdered form.

5. A process as defined in claim 4 in which said pulverulent composition is mixed with a water-proofing material to render the composition substantially inert and unreactive with a fire-unstable material when associated therewith.

* * * * *